(12) United States Patent
Shenderovich

(10) Patent No.: US 6,976,109 B2
(45) Date of Patent: Dec. 13, 2005

(54) MULTI-LEVEL AND MULTI-RESOLUTION BUS ARBITRATION

(75) Inventor: Georgiy Shenderovich, Petah-Tiqwa (IL)

(73) Assignee: NeoMagic Israel Ltd., Netanya (IL)

( * ) Notice: Subject to any disclaimer, the term of this patent is extended or adjusted under 35 U.S.C. 154(b) by 279 days.

(21) Appl. No.: 10/414,310

(22) Filed: Apr. 16, 2003

(65) Prior Publication Data

US 2004/0210694 A1 Oct. 21, 2004

(51) Int. Cl.[7] ............................................. G06F 13/14
(52) U.S. Cl. ....................... 710/243; 710/244
(58) Field of Search ................. 710/111, 113–114, 710/116–117, 240–244, 120, 260, 262, 264–265

(56) References Cited

U.S. PATENT DOCUMENTS

| | | | | |
|---|---|---|---|---|
| 3,787,631 A | * | 1/1974 | Lewis | 370/365 |
| 4,009,470 A | * | 2/1977 | Danilenko et al. | 711/151 |
| 5,151,994 A | * | 9/1992 | Wille et al. | 710/116 |
| 5,241,632 A | * | 8/1993 | O'Connell et al. | 710/117 |
| 5,528,767 A | * | 6/1996 | Chen | 710/113 |
| 5,530,903 A | * | 6/1996 | Calvignac et al. | 710/41 |
| 5,546,548 A | * | 8/1996 | Chen et al. | 710/116 |
| 5,572,686 A | * | 11/1996 | Nunziata et al. | 710/116 |
| 5,689,657 A | * | 11/1997 | Desor et al. | 710/119 |
| 5,729,702 A | * | 3/1998 | Creedon et al. | 710/111 |
| 5,933,616 A | * | 8/1999 | Pecone et al. | 710/240 |
| 6,016,528 A | * | 1/2000 | Jaramillo et al. | 710/243 |
| 6,026,461 A | * | 2/2000 | Baxter et al. | 710/244 |
| 6,092,137 A | * | 7/2000 | Huang et al. | 710/111 |
| 6,157,989 A | * | 12/2000 | Collins et al. | 711/151 |
| 2003/0229742 A1 | * | 12/2003 | Moss | 710/111 |

FOREIGN PATENT DOCUMENTS

| | | | | | |
|---|---|---|---|---|---|
| DE | DT 2606210 A | * | 2/1981 | | G06F 3/04 |
| GB | 1530173 A | * | 10/1978 | | G06F 3/04 |

* cited by examiner

Primary Examiner—Paul R. Myers
Assistant Examiner—Ryan Stiglic
(74) Attorney, Agent, or Firm—Dekel Patent Ltd.; David Klein

(57) ABSTRACT

A method for bus arbitration comprising assigning priorities changeable with time to requesters of a data bus, and for simultaneous bus requests by more than one requestor, granting usage of the bus to the requester with the highest priority at the time of the bus requests.

3 Claims, 8 Drawing Sheets

MULTI-LEVEL AND MULTI-RESOLUTION BUS ARBITRATION

FIELD OF THE INVENTION

The present invention relates generally to arbitration apparatus and methods for a shared bus system, and particularly to apparatus and methods which may be used for multi-level and multi-resolution bus arbitration.

BACKGROUND OF THE INVENTION

"Bus arbitration" refers to controlling access to a shared data bus in order to utilize the bus efficiently and to ensure that each competing bus user has a fair opportunity to access the bus.

Many patents address the problem of bus arbitration. For example, U.S. Pat. No. 6,092,137 to Huang, et al. assigns each competing source (i.e., bus user) an adjustable priority weighting value (PWV) that is initially set to a value that reflects the bandwidth requirements of the competing source (CS). During arbitration, the competing source with the lowest PWV is granted access to the bus. For each arbitration in which $CS_i$ is not granted bus access, $PWV_i$ is reduced by one so that the longer $CS_i$ is denied bus access, the greater the likelihood that $CS_i$ will be chosen. After $CS_i$ is granted access, $PWV_i$ is reset to its initial value.

U.S. Pat. No. 6,092,137 further provides an arbitration protocol, which requires reduced circuit size to compare the priority values of the competing sources that have requested access to the shared data bus. This reduced circuit size is achieved by using a multi-level arbitration scheme. Initially, competing sources are classified into competing source groups based on their bandwidth requirements so that competing sources having the same, or similar, bandwidth requirements are assigned to the same group. Each competing source group is assigned to a first level arbiter, which may utilize conventional arbitration schemes such as round robin arbitration or first-come first-serve.

U.S. Pat. No. 5,528,767 to Chen describes a programmable multi-level bus arbitration apparatus for computer systems, which implements dynamic arbitration for the grant of control over a system bus by one of a number of bus master devices. A number of programmable restricters each receive a system bus request signal issued by a corresponding one of the bus master devices competing for the control over the system bus. The restricters block or relay the bus request signal. A programmable priority arbiter receives an output of each of the restricters for arbitration to grant control of the system bus to a selected one of the bus master devices based on a pre-programmed priority scheme. A communication protocol handler receives and monitors the status of the bus enable signal for generating a bus busy signal to control the issuing of a verified bus request signal by one of the restricters or the blocking of the bus request signal based on the status of the bus busy signal.

U.S. Pat. No. 6,157,989 to Collins describes an arbitration and task switching technique in a real-time multiprocessor data processing system having a common bus and a segmented shared memory, where fullness of memory segments of the shared memory is used as a measurement for arbitration and task switching priorities. A bus request mechanism in each of the processors dynamically calculates normalized priority values based on relative needs across the system. The normalized priority calculation is based on monitoring the fullness of memory segments of the shared memory associated with each processor of the system. Using this normalized priority calculation, the bus access order and bus bandwidth are optimally allocated according to tasks executed by the processors. Also, the normalized priority calculation and a preprogrammed threshold is used to control task switching in the multi-processor system.

U.S. Pat. No. 6,026,461 to Baxter describes a method of arbitrating requests for a system bus in a computer system by establishing a window for simultaneously capturing all requests for the system bus. The requests include information about a requested packet type, and an input queue state of the system bus requester. All requests for the system bus are captured during the window. The captured requests are prioritized into high, medium, and low priority based on the information included in the captured requests. Potential system bus targets are examined by their busy signals. Then low priority, medium priority, and high priority requesters are selected as potential bus grant candidates, and then actually granted the bus in accordance with the requests which have been time ordered.

U.S. Pat. No. 5,933,616 to Pecone, et al. describes a computer system wherein a bus master generates a signal indicative of the type of cycle it plans to initiate when requesting bus ownership. Other bus masters may be configured to generate similar cycle-type signals. A bus arbiter samples each master's unique cycle type signal during the request phase, and further receives information regarding the status of various target resources. Based upon the cycle type signals from requesting masters and upon the target resource information, the bus arbiter determines whether a master is planning to access an unavailable target resource. A master that is planning to access an unavailable target resource will be denied access of the bus. Accordingly, other masters intending to initiate cycles to available target resources may be granted ownership of the bus. As a result, target termination retry cycles may be avoided, and bus bandwidth and overall system performance may be improved.

U.S. Pat. No. 5,689,657 to Desor et al. describes a bus arbitration method for a multimaster system, comprising a plurality of masters sharing a global data bus and a plurality of bus arbiters sharing a global identification bus. Each active bus arbiter applies to the identification bus a bus request signal containing a k-bit-wide identification word representative of the priority of the master associated with the bus arbiter. In each prioritization step of the bus grant cycle, a logic level is produced on the identification bus by logically combining bits of equal significance. This logic level is then compared with the corresponding bits of the applied identification words. The k bits of the identification words of the bus arbiters are placed on the identification bus on a time-graded basis; in each prioritization step of the bus grant cycle, only those bits of the identification words are placed on the identification bus which are of equal significance, and in each prioritization step of the bus grant cycle, those bus arbiters whose identification word bit in the prioritization step does not match the logic level of the identification bus are eliminated from the bus arbitration of the bus gram cycle.

SUMMARY OF THE INVENTION

The present invention seeks to provide methods for bus arbitration. The methods may comprise fixed priority arbitration and multi-level, multi-resolution arbitration, as is described in detail hereinbelow. The various functionalities of the invention may be achieved by a single device implementing a single integral algorithm.

There is thus provided in accordance with an embodiment of the present invention a method for bus arbitration comprising assigning priorities changeable with time to requestors of a data bus, and for simultaneous bus requests by more than one requestor, granting usage of the bus to the requestor with the highest priority at the time of the bus requests.

In accordance with an embodiment of the present invention assigning priorities and granting usage of the bus are performed by a single device implementing a single integral algorithm.

Further in accordance with an embodiment of the present invention a requestor, with a higher priority at a previous point in time than the requestor who has now been granted use of the bus, interrupts bus usage of the requestor who has now been granted use of the bus.

Still further in accordance with an embodiment of the present invention bus usage of the requestor who has now been granted use of the bus is interrupted only on a specific data burst boundary of the requestor with the higher priority at a previous point in time.

In accordance with an embodiment of the present invention the interrupted requestor increases its priority and resumes bus usage when the interrupting higher-priority requester finishes an access slot for usage of the bus.

Further in accordance with an embodiment of the present invention when one of the requesters finishes an access slot with the data bus, the priority of that requestor is switched to the lowest priority.

Still further in accordance with an embodiment of the present invention the method comprises not decreasing the priority of at least one of the requesters if that requestor does not request use of the bus.

In accordance with an embodiment of the present invention the method comprises assigning a unique priority to each of the requesters at any given point in time.

Further in accordance with an embodiment of the present invention the method comprises dedicating an access slot for usage of the bus for each of the requesters, the access slot being defined by a number of data bursts transacted by the particular requestor.

Still further in accordance with an embodiment of the present invention the method comprises switching the priority of one requester with the priority of another requestor.

In accordance with an embodiment of the present invention the method comprises switching the priority of a previously-higher-priority requestor with the priority of a previously-lower-priority requester.

Further in accordance with an embodiment of the present invention the method comprises weighting the priority of at least one of the requestors with a weighting factor.

Still further in accordance with an embodiment of the present invention the method comprises modifying the weighting factor at a given point in time.

In accordance with an embodiment of the present invention the method comprises modifying the priorities of a first subset of the requestors and not modifying the priorities of a second subset of the requesters.

There is also provided in accordance with an embodiment of the present invention apparatus for bus arbitration comprising an arbitration block adapted to provide multiple levels of bus arbitration, a decision block adapted to provide multiple resolutions of bus arbitration, and a bus state machine in communication with the arbitration block and the decision block.

In accordance with an embodiment of the present invention the arbitration block comprises at least one request filter, which comprises a multi-channel multiplexer in communication with a control register.

Further in accordance with an embodiment of the present invention the at least one request filter is in communication with a priority resolution block adapted to assign priority codes to priority requests from the at least one request filter.

Still further in accordance with an embodiment of the present invention the at least one request filter is adapted to output master device code output signals to a master device code filter.

In accordance with an embodiment of the present invention the arbitration block comprises a plurality of request filters, each request filter comprising a multi-channel multiplexer in communication with a control register having a priority, and the output of one of the control registers of the register filters is routed to the input of another of the control registers.

Further in accordance with an embodiment of the present invention the control register output of a first request filter is connected to the control register input of a second request filter, wherein the priority of the first request filter is lower than the priority of the second request filter.

Still further in accordance with an embodiment of the present invention an update logic unit is adapted to modify the priority of the control registers.

In accordance with an embodiment of the present invention the arbitration block comprises a plurality of request filters and wherein the decision block comprises a slot machine adapted to provide different weighting factors to the request filters.

Further in accordance with an embodiment of the present invention the decision block comprises a slot boundary detector, a slot counter and a slot register.

Still further in accordance with an embodiment of the present invention the decision block further comprises a decrement logic unit.

In accordance with an embodiment of the present invention the slot counter comprises a countdown counter that has an auto-reload feature, activated each time the slot counter attains a zero value.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1A:
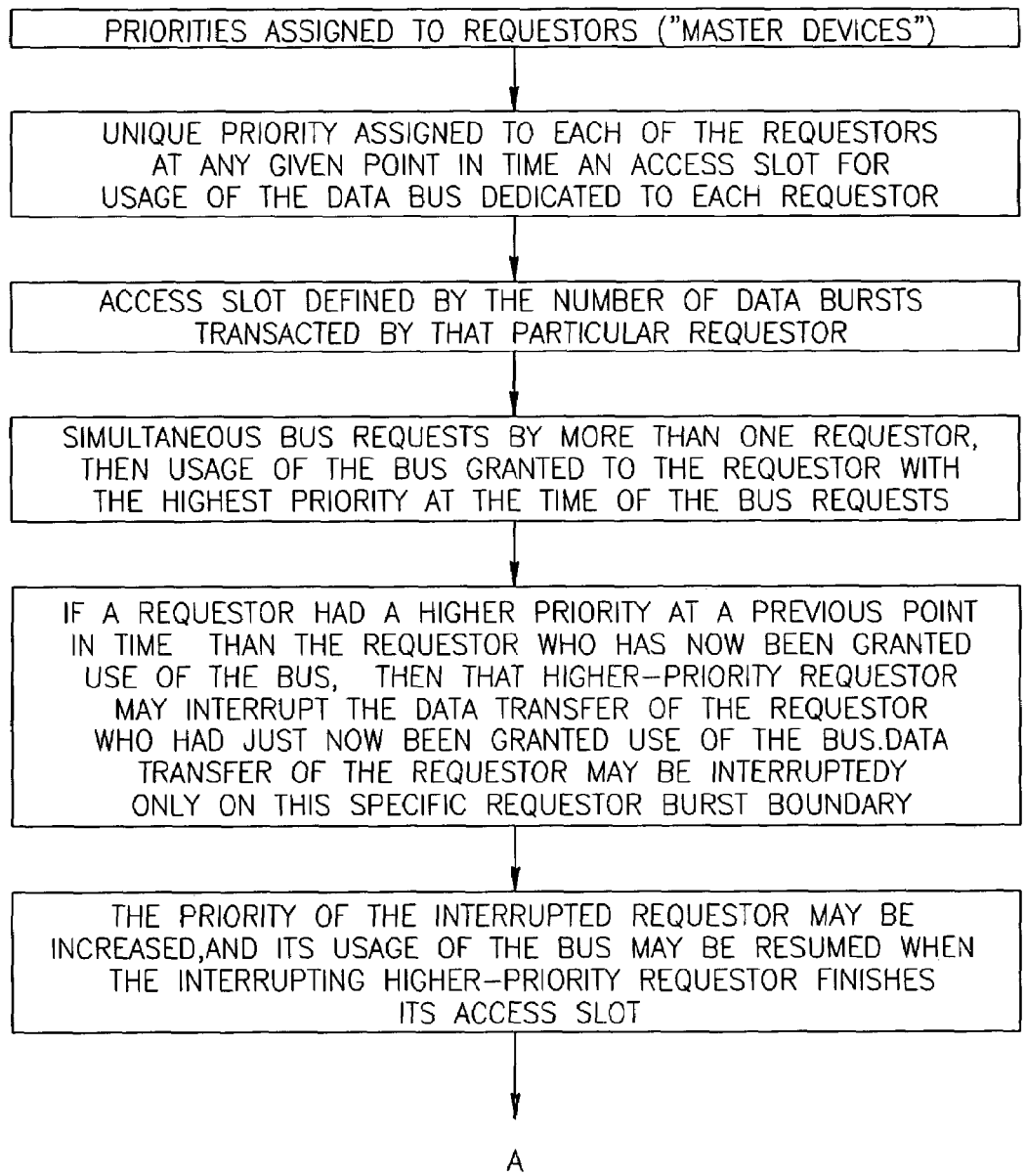
FIGS. 1A–1B form a simplified flow chart of methods for bus arbitration, in accordance with embodiments of the invention.
Figure 1B:
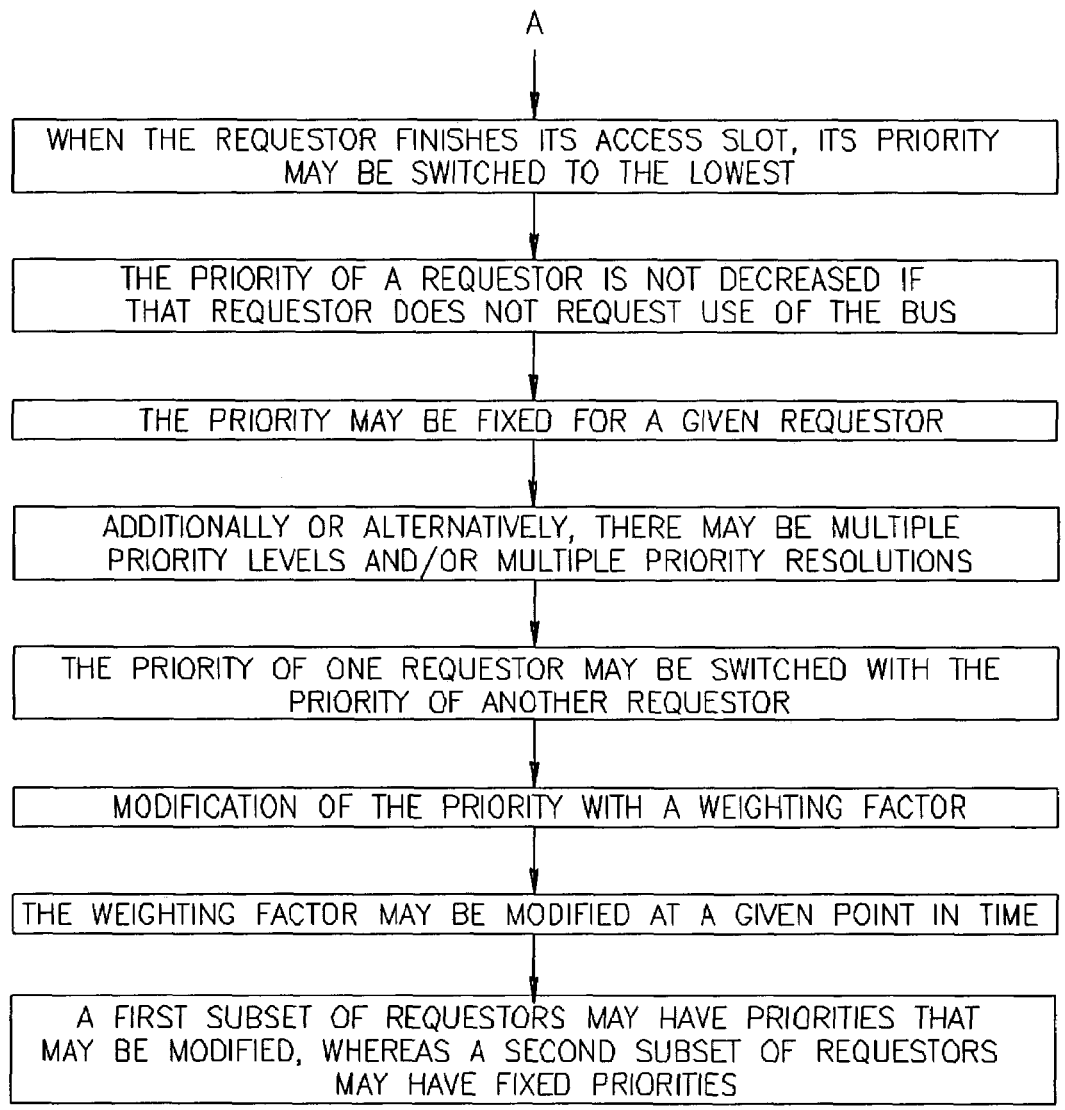

Reference is now made to FIGS. 1A–1B, which illustrate methods for bus arbitration, in accordance with embodiments of the invention.

In an embodiment of the invention, priorities, which are changeable with time, may be assigned to requesters (also referred to herein as "master devices") of a data bus. A unique priority may be assigned to each of the requesters at any given point in time. An access slot for usage of the data bus may be dedicated to each requestor. The access slot may be defined by the number of data bursts transacted by that particular requestor.

If there are simultaneous bus requests by more than one requestor, then usage of the bus may be granted to the requestor with the highest priority at the time of the bus requests. The current priority is not necessarily the same as the initial priority or a previous priority. How the priority changes, such as but not limited to, by means of weighting factors, is described hereinbelow with reference to FIGS. 2–7.

In accordance with an embodiment of the invention, if a requestor had a higher priority at a previous point in time than the requestor who has now been granted use of the bus, then that higher-priority requestor may interrupt the data transfer (i.e., the bus usage) of the requestor who had just now been granted use of the bus. The data transfer of the requestor may be interrupted only on this specific requestor burst boundary. In other words, the bus usage of the requestor who has now been granted use of the bus may be interrupted only on a specific data burst boundary of the requestor with the higher priority at a previous point in time.

The priority of the interrupted requestor may be increased, and its usage of the bus may be resumed when the interrupting higher-priority requestor finishes its access slot for usage of the bus.

When the requestor finishes its access slot, its priority may be switched to the lowest priority. In this manner, the most active requestor may have the lowest priority and give precedence to less active requestors.

In accordance with an embodiment of the invention, the priority of a requestor is not decreased if that requestor does not request use of the bus. This is in contrast to prior art systems, wherein a user could possibly wait a long time in a queue for the bus and just when it gets its turn it does not need to transfer data with the bus, and unfairly must go back to the end of the queue.

Accordingly, in the above-described method, the priority may be fixed for a given requestor. In accordance with another embodiment of the invention, there may be multiple priority levels and/or multiple priority resolutions. The priority of one requestor may be switched with the priority of another requestor. For example, the priority of a previously-higher-priority requestor may be switched with the priority of a previously-lower-priority requestor.

The priority of one or more of the requestors may be modified with a weighting factor. The weighting factor may be modified at a given point in time.

The fixed priority and multiple priority levels and/or multiple priority resolutions may be combined. For example, a first subset of requesters (e.g., low priority requesters) may have priorities that may be modified (e.g., switched to the priority of another requestor, or weight-factor modified or any other multiple level or multiple resolution scheme), whereas a second subset of requesters. (e.g., high priority requesters) may have fixed priorities.

Figure 2:
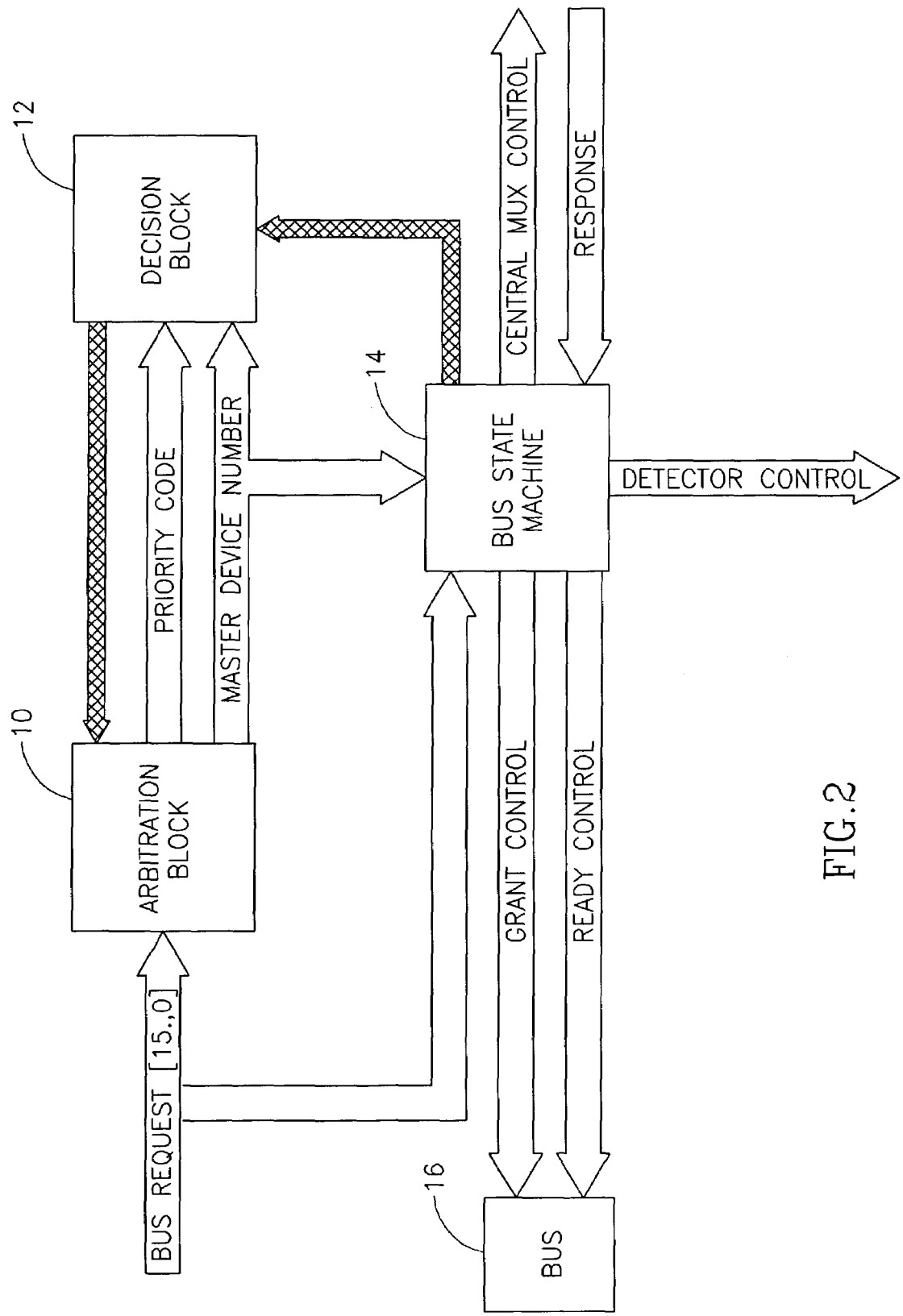
FIG. 2 is a simplified general block diagram of apparatus for bus arbitration, comprising an arbitration block and a decision block, in accordance with an embodiment of the invention.

Reference is now made to FIG. 2, which illustrates a general block diagram of apparatus for bus arbitration, in accordance with an embodiment of the invention, and which may be used to carry out the fixed priority, multiple priority level and/or multiple priority resolution methods and any combination thereof. The apparatus may comprise an arbitration block 10, which may be used to implement a mixed multi-level arbitration method, as described in detail further hereinbelow. The arbitration block 10 may be in communication with a decision block 12, which may provide multiple resolution (e.g., multiple weighting factors used in the arbitration process), as described in detail further hereinbelow. Both arbitration block 10 and decision block 12 may be controlled by a bus state machine 14 of an external user system that uses a bus 16. Bus state machines are known and available in the art, and may be specific to the particular needs of the system to share bus 16.

Arbitration block 10 may receive bus requests for use of bus 16 from different requesters (master devices). Arbitration block 10 may arbitrate between the requests and grant usage of bus 16 to one of the master devices. As described hereinbelow, in one embodiment of the invention, the decision block 12 may play a role in deciding which master device is granted current usage of bus 16.

Figure 3:
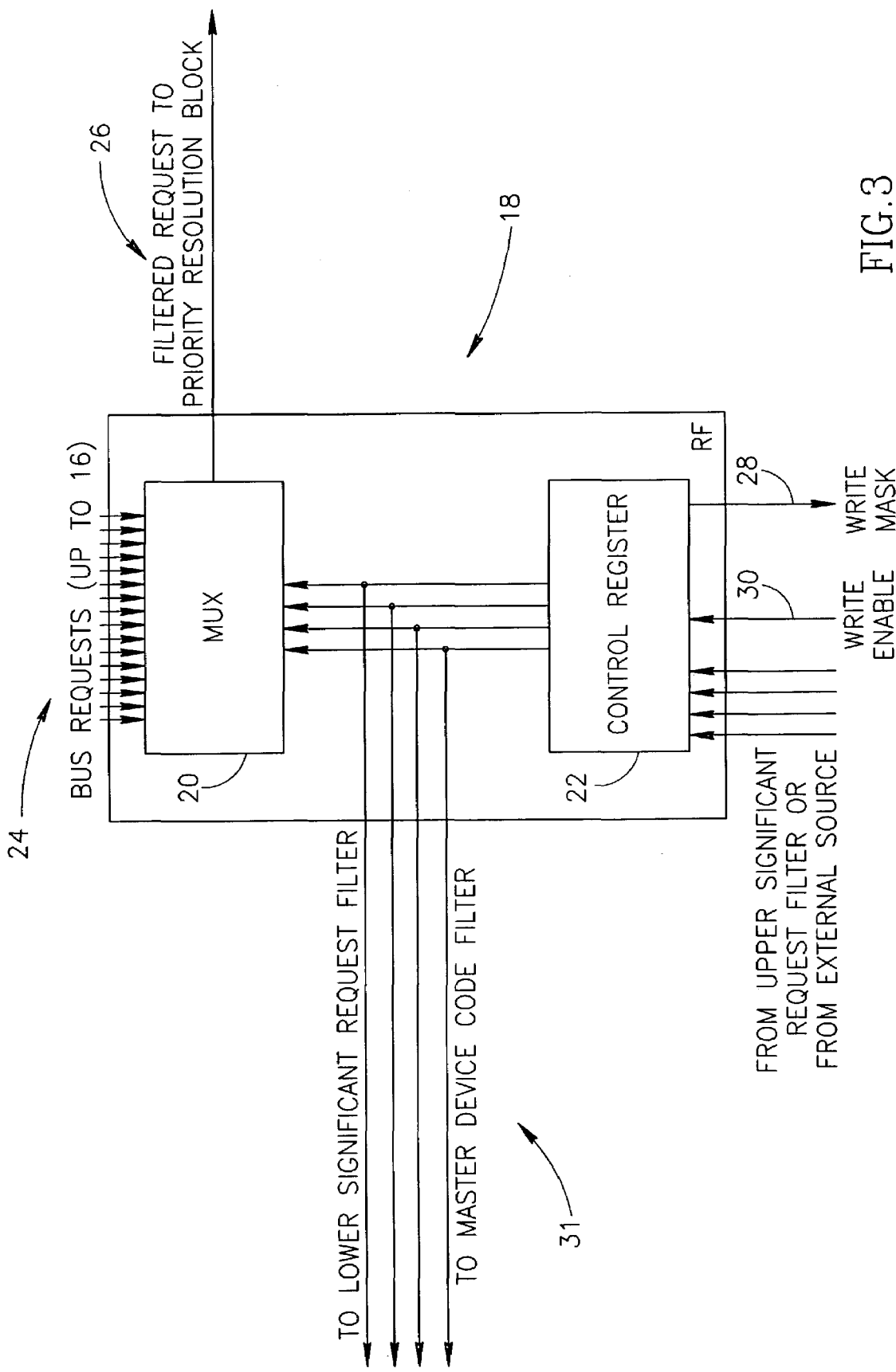
FIG. 3 is a simplified block diagram of a request filter, one or more of which may be used in the arbitration block of FIG. 2, in accordance with an embodiment of the invention.

Reference is now made to FIG. 3, which illustrates a request filter 18, one or more of which may be used in the arbitration block 10, in accordance with an embodiment of the invention. Request filter 18 may comprise a multi-channel multiplexer 20 in communication with a control register 22. In the illustrated embodiment, multiplexer 20 comprises a 16-channel multiplexer, but the invention is not limited to this number of channels. Control register 22 may comprise master device numbers that have been assigned to the master devices. When a particular master device requests use of the bus 16, that device inputs a bus request 24 to multiplexer 20. Using the master device number corresponding to the requesting master device, multiplexer 20 may activate a filtered request output 26 (which may be sent to a priority resolution block, as described below). Otherwise, the filtered request output of the specific request filter may remain inactive.

Control register 22 may also comprise a write mask bit 28, which may prevent an external source from updating control register 22 when a write enable signal 30 is active. The value of write mask bit 28 may be output outside request filter 18 and may be accounted by an update logic unit 40 (shown in FIG. 5). A master device code output signal 31 from control register 22 may also be output from request filter 18 to other functional units within arbitration block 10, as described with reference to FIG. 4.

Figure 4:
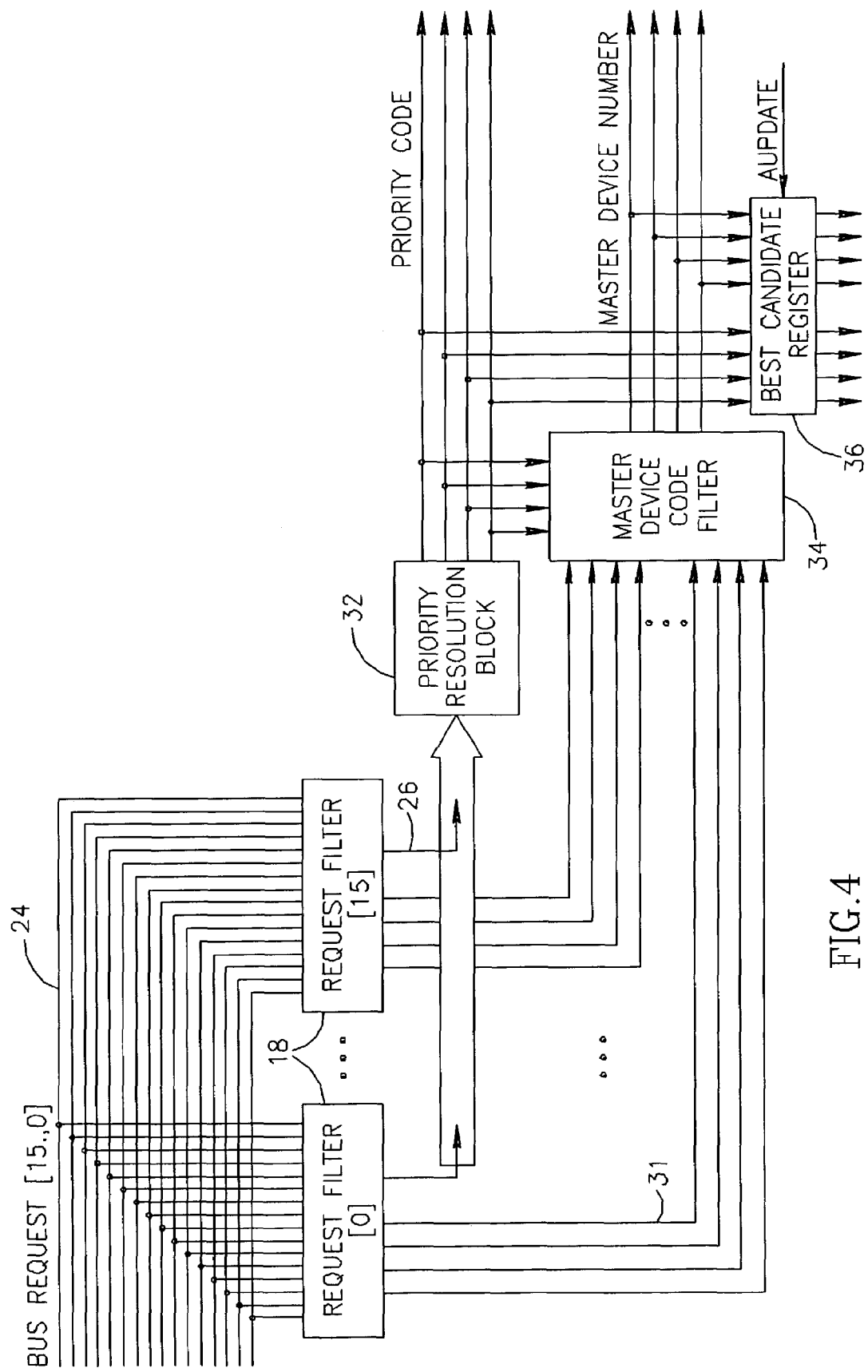
FIG. 4 is a simplified block diagram of apparatus for bus arbitration, which may be used in a fixed priority arbitration method, in accordance with an embodiment of the invention.

In one embodiment of the invention, the arbitration method may comprise a fixed priority arbitration method, as is now explained with reference to FIG. 4. In the illustrated embodiment, the fixed priority arbitration method may employ 16 request filters, but the invention is not limited to this number of channels.

The filtered request output 26 of request filter 18 may be sent to a priority resolution block 32. For example, priority resolution block 32 may assign the code 0000 (highest priority) to the priority request from request filter 0, whereas the priority request from request filter 15 may be assigned the code 1111 (lowest priority).

The master device code output signals 31 from request filters 18 may be output to a master device code filter 34. Master device code filter 34 may use a priority code calculated by priority resolution block 32 to connect the output of the control register 22 of the appropriate request filter 18 to the master device number outputs. The master device number and priority code output signals may be used to determine the best candidate for current use of bus 16. The best candidate information may be stored in a best candidate register 36 for configuring the arbitration block update logic, as described hereinbelow.

Figure 5:
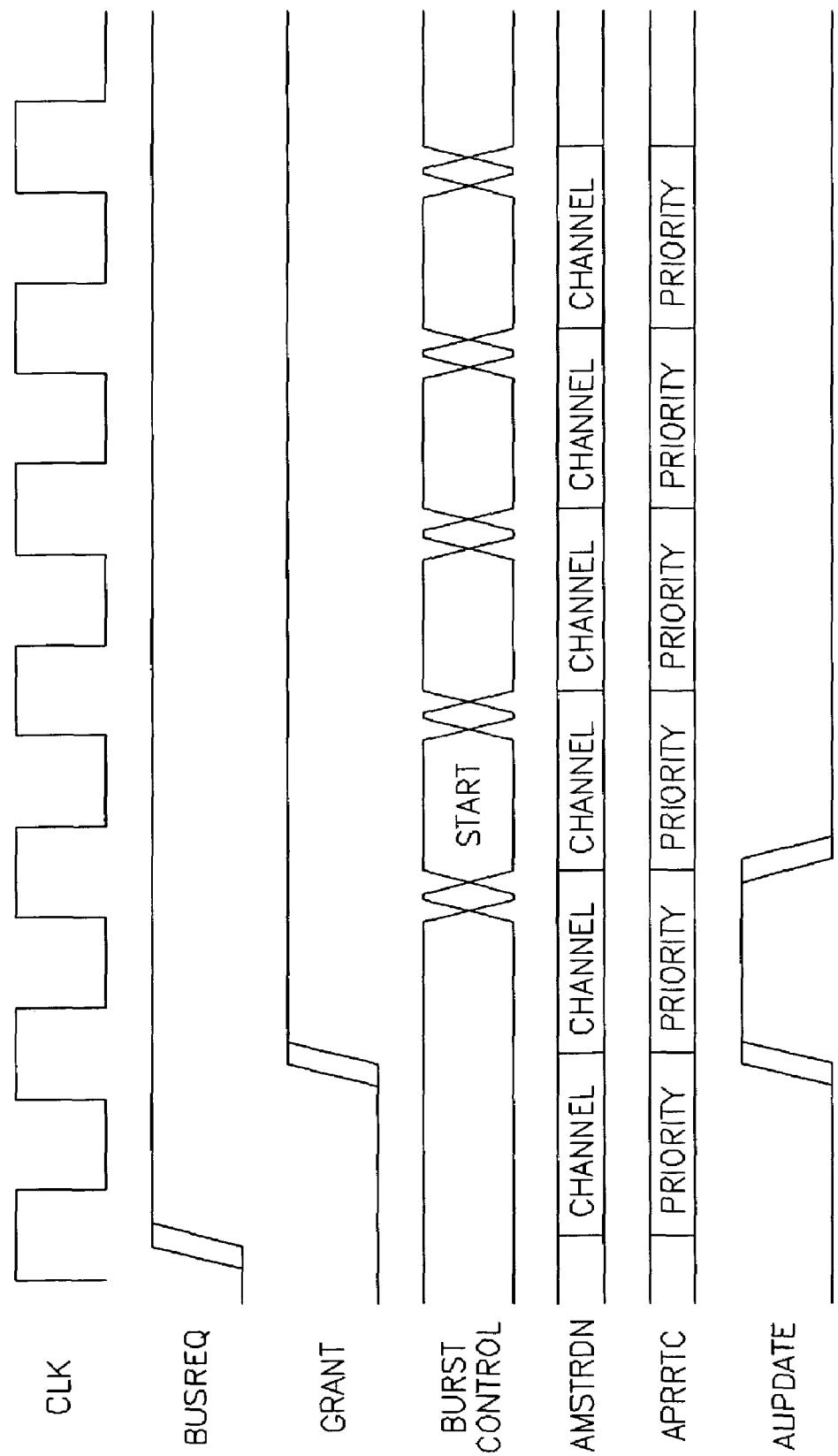
FIG. 5 is a simplified block diagram of different signals which may be used in the course of the arbitration methods of the invention.

Reference is now made additionally to FIG. 5, which illustrates different signals that may be used in the course of the arbitration methods of the invention. The best candidate information may be stored in best candidate register 36 on the clock boundary CLK corresponding to the data burst of the requesting master device. In FIG. 5, AMSTRDN refers to the master device number, and APRRTC refers to the priority code. A signal for updating the arbitration block 10, called the AUPDATE signal, may be generated by the system bus state machine 14 and may be a function of a BUSREQ (bus request) signal detection. The system bus state machine 14 may issue the AUPDATE signal to arbitration block 10 immediately after detecting the bus request signal 24 from one or more master devices. On the rising edge of the clock signal, the system bus state machine 14 may sample the master device number information from arbitration block 10, send a GRANT signal to the selected master device, and issue the AUPDATE signal latching the best candidate information within best candidate register 36.

Figure 6:
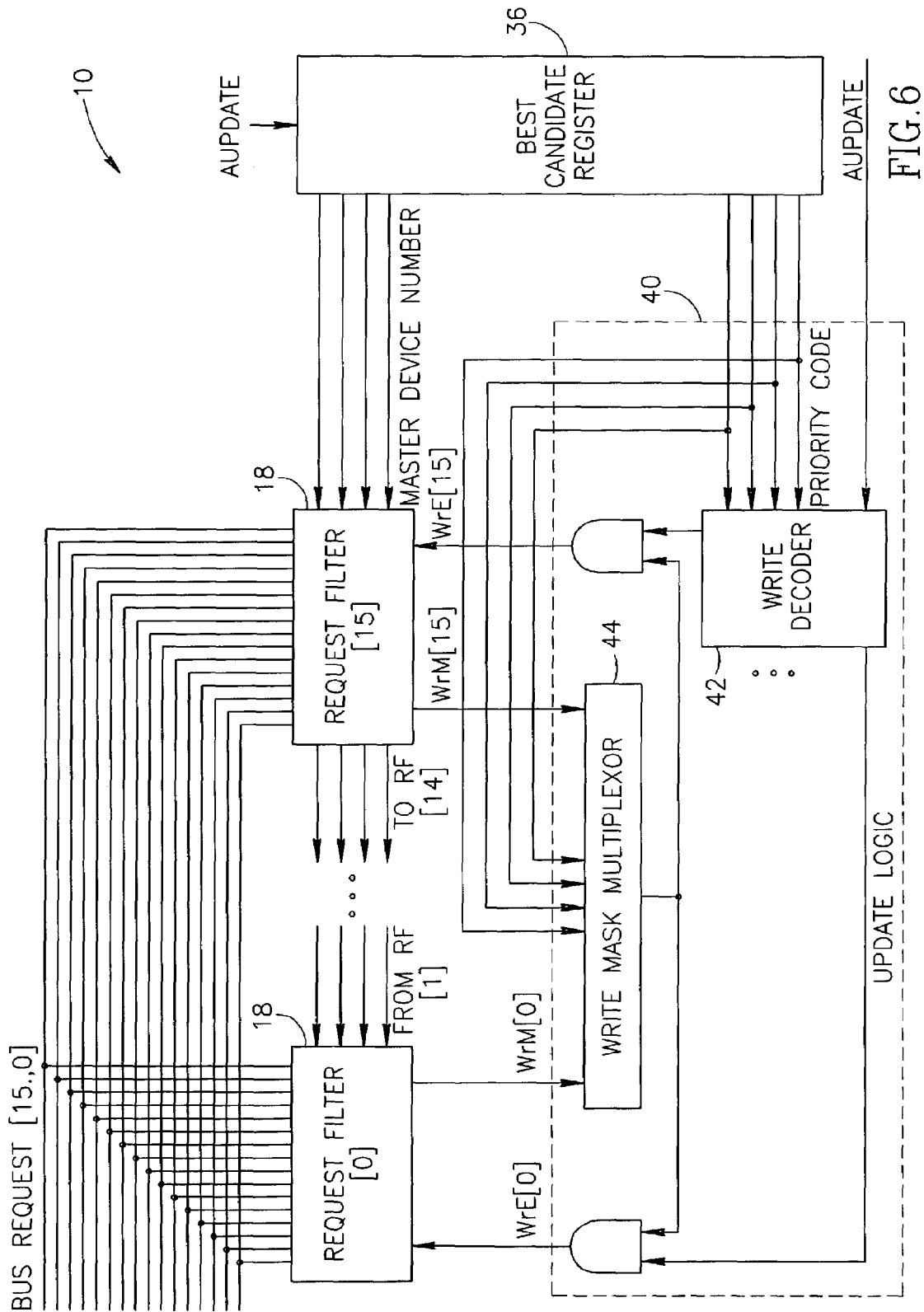
FIG. 6 is a simplified block diagram of apparatus for bus arbitration, which may be used in a multi-level priority arbitration method, in accordance with an embodiment of the invention.

In another embodiment of the invention, the arbitration method may comprise a multi-level priority arbitration method, as is now explained with reference to FIG. 6. The fixed priority arbitration method described just before with reference to FIG. 4 may be combined with the multi-level priority arbitration method of FIG. 6.

One way of implementing a multi-level priority rotation within arbitration block 10, although the invention is not limited to this implementation, is by routing the outputs of the control registers 22 of the register filters 18 together. For example, the control register output of the lowest priority request filter may be connected to the control register input of the second lowest request filter, whose control register output may in turn be connected to the control register input of the third lowest request filter and so on. The control register output of the highest priority request filter may not be connected to any other request filter. The control register input of the lowest priority request filter may be connected to the master device number output of the best candidate register 36.

An update logic unit 40 (FIG. 5) may be provided in arbitration block 10 for modification of the control registers 22 within request filters 18, such as synchronous rotation and update of the control registers 22. The update logic unit 40 may comprise, without limitation, a write decoder 42 and a write mask multiplexer 44. Rotation and update of control registers 22 may occur when an AROTATE input signal to the update logic unit 40 becomes active. (The AROTATE signal may come from decision block 12, as described hereinbelow with reference to FIG. 7.) Write decoder 42 may analyze input the condition of the priority code signals and permit updating control registers 22 only if a predetermined criterion is met, such as but not limited to, the request filters 18 having the same or lower priority weighting factor. The weighting factors may be modified by decision block 12, as described hereinbelow with reference to FIG. 7.

Figure 7:
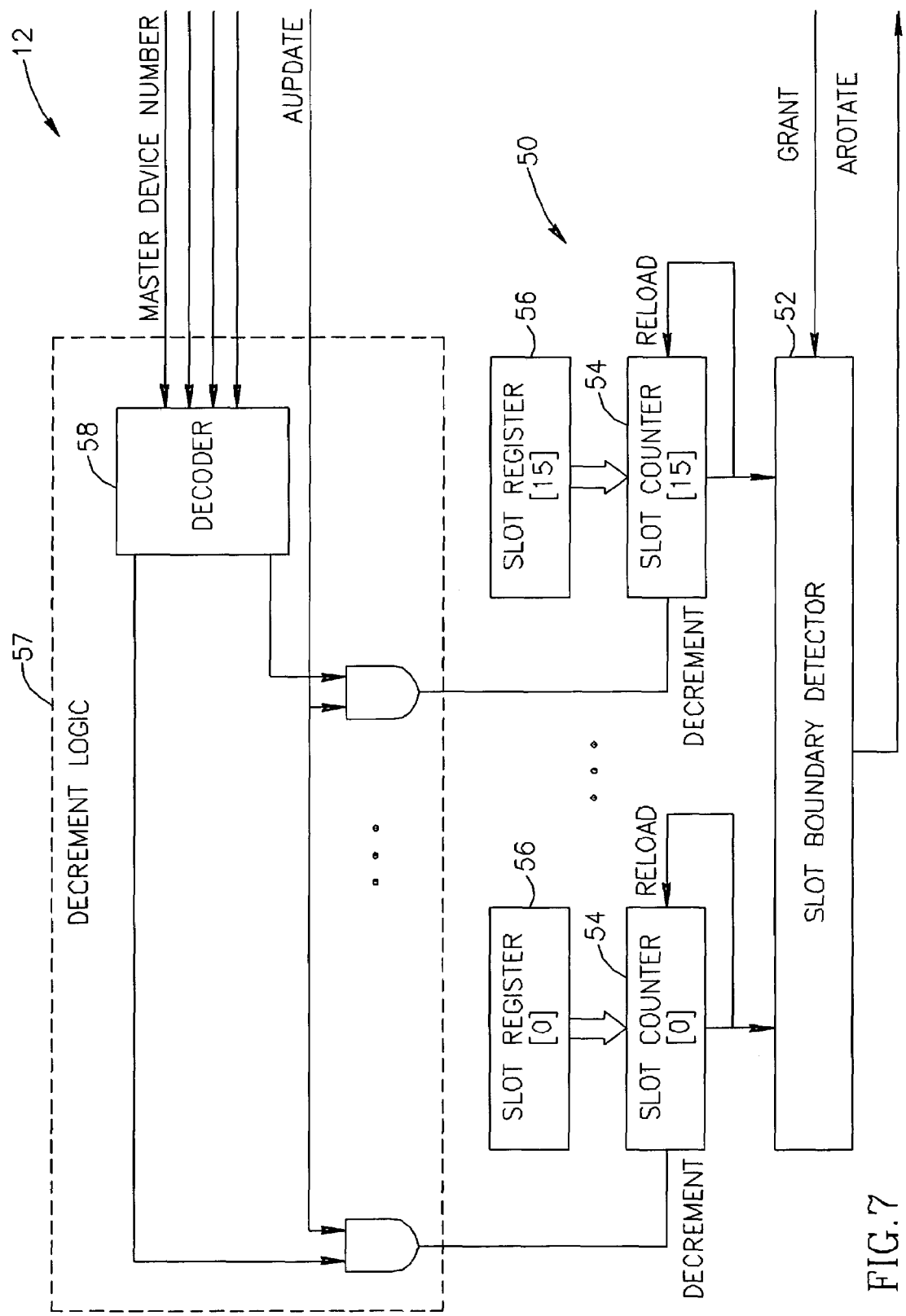
FIG. 7 is a simplified block diagram of a decision block, which may be used to implement a multi-resolution arbitration method in accordance with an embodiment of the invention.

Reference is now made to FIG. 7, which illustrates a simplified block diagram of decision block 12, which may be used to implement a multi-resolution arbitration method.

Decision block 12 may comprise a slot machine 50, which may comprise without limitation, a slot boundary detector 52, slot counters 54 and slot registers 56. One slot register 56 may be provided for each master device. There may be a one-to-one correspondence between slot counters 54 and slot counters 54. Decision block 12 may further comprise a decrement logic unit 57 comprising a decoder 58.

Slot machine 50 may provide different weighting factors to request filters 18 between bus request input signals during the arbitration process. The different weighting factors may be calculated based upon the dedicated bus-usage time slot (i.e., access window) for the master device, measured in terms of data bursts initiated by the particular master device that may be performed without reducing the priority level for the particular master device.

Slot counter 54 may comprise a countdown counter that has an auto-reload feature, activated each time slot counter 54 attains a zero value. Slot counter 54 may be initially loaded when activating the arbitration apparatus.

The count of slot counter 54 may be decremented by the AUPDATE signal coming from the system bus state machine 14, as controlled by the decrement logic unit 57. The decrement logic unit 57 may choose which slot counter 54 to decrement by decoding the master device number input signals coming from arbitration block 10.

The slot boundary detector 52 may detect when the zero-indicating outputs of slot counters 54 change, and generate a AROTATE signal of a one-clock-period length, synchronized by the GRANT signal coming from the system bus state machine 14. As described hereinabove with reference to FIG. 6, the AROTATE signal may initiate rotation and update of control registers 22 of request filters 18, thereby providing multiple levels of priority in the arbitration method.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. Apparatus for bus arbitration comprising:
   an arbitration block adapted to provide multiple levels of bus arbitration;
   a decision block adapted to provide multiple resolutions of bus arbitration; and
   a bus state machine in communication with said arbitration block and said decision block, wherein said arbitration block comprises a plurality of request filters, each request filter comprising a multi-channel multiplexer in communication with a control register having a priority, and the output of one of the control registers of the register filters is routed to the input of another of the control registers.

2. Apparatus according to claim 1, wherein the control register output of a first request filter is connected to the control register input of a second request filter, wherein the priority of the first request filter is lower than the priority of the second request filter.

3. Apparatus according to claim 1, further comprising an update logic unit adapted to modify the priority of said control registers.

* * * * *